(12) United States Patent
Wang et al.

(10) Patent No.: US 12,710,349 B2
(45) Date of Patent: Aug. 18, 2026

(54) METHOD FOR MEASURING PORE SIZE AND PORE SIZE DISTRIBUTION OF FILTER MEMBRANE

(71) Applicant: SHANGHAI UNIVERSITY OF ENGINEERING SCIENCE, Shanghai (CN)

(72) Inventors: Jinjie Wang, Shanghai (CN); Guanghui Li, Shanghai (CN); Pinhua Rao, Shanghai (CN); Jian Guo, Shanghai (CN); Junwei Zhang, Shanghai (CN); Jiaying Zhu, Shanghai (CN)

(73) Assignee: SHANGHAI UNIVERSITY OF ENGINEERING SCIENCE, Songjiang District (CN)

( * ) Notice: Subject to any disclaimer, the term of this patent is extended or adjusted under 35 U.S.C. 154(b) by 495 days.

(21) Appl. No.: 18/274,523

(22) PCT Filed: Apr. 27, 2021

(86) PCT No.: PCT/CN2021/090288
§ 371 (c)(1),
(2) Date: Jul. 27, 2023

(87) PCT Pub. No.: WO2022/170680
PCT Pub. Date: Aug. 18, 2022

(65) Prior Publication Data

US 2024/0085303 A1 Mar. 14, 2024

(30) Foreign Application Priority Data

Feb. 9, 2021 (CN) ......................... 202110181501.4

(51) Int. Cl.
*G01N 15/08* (2006.01)

(52) U.S. Cl.
CPC . *G01N 15/0806* (2013.01); *G01N 2015/0846* (2013.01)

(58) Field of Classification Search
CPC ....... G01N 15/0806; G01N 2015/0846; G01N 15/088; G01N 2015/084; G01N 15/08; B01D 65/10
See application file for complete search history.

(56) References Cited

U.S. PATENT DOCUMENTS

2013/0075331 A1 3/2013 Peiris et al.
2013/0141722 A1* 6/2013 Wood .................... G01N 21/53 356/338

FOREIGN PATENT DOCUMENTS

CN 103506013 A 1/2014
CN 104101586 A 10/2014
(Continued)

OTHER PUBLICATIONS

CN106823823 Zheng et al.—Determining Filter membrane Pore Size Distribution (Ab & MT; Jun. 13, 2017; 33 p) (Year: 2017).*
(Continued)

*Primary Examiner* — Hayden Brewster
(74) *Attorney, Agent, or Firm* — William J. Barber; WARE FRESSOLA MAGUIRE & BARBER LLP

(57) ABSTRACT

A method for determining the pore size and pore size distribution of a filtration membrane comprises: selecting a group of fluorescent pellets having different diameters and emission wavelengths as a reference; plotting the standard curve between the concentration and fluorescence intensity for each fluorescent pellet at its emission wavelength; uniformly dispensing a group of fluorescent pellets as a reference substance in water to prepare a mixed suspension of which the mass concentration of each fluorescent pellet; using the filter membrane to be tested to perform one-time filtration on the mixed suspension prepared, then performing
(Continued)

fluorescence detection on the obtained filtrate, calculating the concentration of each fluorescent pellet in the filtrate the retention rate of the filtration membrane to be tested for each fluorescent pellet; and calculating the pore size and pore size distribution of the filter membrane to be tested accordingly.

6 Claims, 9 Drawing Sheets

(56) References Cited

FOREIGN PATENT DOCUMENTS

| | | | |
|---|---|---|---|
| CN | 105865988 | A | 8/2016 |
| CN | 205461841 | U | 8/2016 |
| CN | 106823823 | A | 6/2017 |
| CN | 109224867 | A | 1/2019 |
| CN | 111773932 | A | 10/2020 |
| JP | 2006068634 | A | 3/2006 |
| JP | 2011223924 | A | 11/2011 |

OTHER PUBLICATIONS

CN109224867 Chen et al.—Method of membrane pore diameter (Ab. & MT; Jan. 18, 2019; 38 p) (Year: 2019).*

X.L. Lv "Method for determination of pore size and distribution of ultrafiltration membranes", Technology of Water Treatment, vol. 21 No. 5, Oct. 31, 1995, 4 pages.

International Search Report issued in corresponding international patent application PCT/CN2021/090288 dated Nov. 11, 2021.

* cited by examiner

METHOD FOR MEASURING PORE SIZE AND PORE SIZE DISTRIBUTION OF FILTER MEMBRANE

FIELD OF THE INVENTION

The present invention relates to a method for determining the pore size and pore size distribution of a filtration membrane, belonging to the technical field of filter membrane characterization.

BACKGROUND OF THE INVENTION

In recent years, membrane-based separation technology has been widely used in various fields. For a filtration membrane, as its pore size and pore size distribution are important performance metrics, accurate pore size and pore size distribution determination is of great importance.

At present, methods for pore size and pore size distribution determination of filtration membranes used in China and abroad can be categorized into two classes: 1) direct determination, which relies mainly on electron microscopy, such as, inter alia, the commonly used scanning electron microscopy and transmission electron microscopy; and 2) indirect determination utilizing pore size-related physical phenomena, which involves experimentally measuring corresponding physical parameters and calculating an equivalent pore size of the membrane on the presumption that all the pores are uniform circular through pores. Indirect determination methods majorly include, among others, the bubble point, mercury intrusion, nitrogen adsorption, liquid-liquid displacement, gas permeation, molecular weight cut-off, suspension filtration methods. Although electron microscopy is intuitive, this method is destructive and suffers from a small observation range and low general representativeness of the obtained information. The bubble point method is limited to being used to determine the size of the biggest membrane pores, and when used in the measurement of an ultrafiltration membrane with a small pore size, would require a pressure that is much higher than the operating pressure of the membrane. Therefore, the bubble point method is generally considered only suitable for the measurement of microfiltration membranes. The mercury intrusion method measures void pores, rather than only "active pores" of interest running through a membrane. Moreover, the mercury intrusion method requires a very high test pressure, which tends to cause deformation of the sample and distort the measurement results. Therefore, the mercury intrusion method is not suitable for pore size measurement of ultrafiltration membranes. The liquid-liquid displacement method is capable of pore size and pore size distribution determination of ultrafiltration membranes with an average pore size less than 0.02 μm (with a relative error<10%), but it uses n-butanol and water, which may have an adverse impact on the membrane material. This problem cannot be circumvented by using another liquid-liquid system because any other system may also adversely affect the membrane material. The molecular weight cut-off method is suitable for the measurement of ultrafiltration membranes with a small pore size, but different results may be obtained when different substances are used as reference standards.

The suspension filtration method can be used to directly evaluate the separation performance of a membrane and offers the advantages of accurate measurement results and a wide pore size measurement range. For example, Chinese Patent Application No. CN201710107174.1 discloses a method of determining a pore size and pore size distribution of an ultrafiltration membrane. This method is based on suspension filtration and utilizes polystyrene nano-particles as reference standards. An ultraviolet (UV) spectrophotometer is used to scan the maximum absorption wavelength of the polystyrene nanoparticles with each particle size in an ultraviolet visible wavelength range, then a standard curve of the polystyrene nanoparticles with each particle size at the maximum absorption wavelength is plotted of. Subsequently, polystyrene nano-particles of a particular particle size are then selected to prepare a suspension with a mass concentration $C_0$, and uniform dispersion thereof in water is achieved using ultrasonic waves. The suspension is then filtered through the ultrafiltration membrane, and the filtrate is collected, followed by measuring absorbance of polystyrene nano-particles contained therein under a maximum absorption wavelength corresponding to their particle size. A concentration $C_t$ of the polystyrene nano-particles in the filtrate is then calculated according to a standard curve corresponding to the polystyrene nanoparticles with the particle size, and a retention rate R of the ultrafiltration membrane to the polystyrene nano-particles with the particle size is calculated. This process is repeated at each remaining particle size of polystyrene nano-particles, and the membrane hole diameter of the ultrafiltration membrane is calculated from the measured retention rates. Although this method can achieve accurate pore size and pore size distribution determination of an ultrafiltration membrane, it has the following disadvantages: 1) in each repetition, retention information of the filtration membrane for only one particle size can be obtained, and at least three repetitions are necessary for pore size and pore size distribution calculation of the filtration membrane, leading to cumbersome operation (each repetition involves solution preparation, filtration and detection steps), complexity of the test equipment and a long measurement cycle (the entire determination process (not including the plotting of the standard curves) may take at least 5-6 hours); 2) it is costly because the consumption of both the filtration membrane (one filtration membrane sample is used and scrapped in each repetition, and therefore three in case of three repetitions) and the reference standards (in each repetition, a reference standard suspension at a concentration of 25 μg/mL is used at an amount of at least tens to hundreds of milliliters).

SUMMARY OF THE INVENTION

In view of the above-described problems with the prior art, it is an object of the present invention to provide a method for determining the pore size and pore size distribution of a filtration membrane, which enables easy operation, a short measurement cycle and accurate determination at low cost.

To achieve the above object, the subject matter of the present invention is as follows:

A method for determining the pore size and pore size distribution of a filter membrane, comprising the following steps:

a) selecting a group of fluorescent pellets having different diameters and different emission wavelengths as a reference substance;

b) plotting the standard curve between the concentration and the fluorescence intensity for each fluorescent pellet as a reference substance at its emission wavelength;

c) uniformly dispensing a group of fluorescent pellets as a reference substance in water to prepare a mixed suspension of which the mass concentration of each fluorescent pellet is $C_0$;

d) using the filter membrane to be tested to perform one-time filtration on the mixed suspension prepared in step c), then performing fluorescence detection on the obtained filtrate, and calculating the concentration $C_t$ of each fluorescent pellet in the filtrate according to the standard curve obtained in step b), and then calculating the retention rate R of the filtration membrane to be tested for each fluorescent pellet according to the following formula:

$$R=(1-C_t/C_0)\times 100\%;$$

e) calculating the pore size and pore size distribution of the filter membrane to be tested according to the obtained diameters and retention rates R of a group of fluorescent pellets as a reference substance.

In a preferred embodiment, the fluorescent pellet is a polystyrene fluorescent pellet.

In an embodiment, step a) selects the following group of polystyrene fluorescent pellets as a reference substance:

polystyrene fluorescent pellets having a diameter of 20 nm and an emission wavelength of 488 nm;
polystyrene fluorescent pellets having a diameter of 77 nm and an emission wavelength of 695 nm;
polystyrene fluorescent pellets having a diameter of 100 nm and an emission wavelength of 460 nm;
polystyrene fluorescent pellets having a diameter of 200 nm and an emission wavelength of 615 nm.

In another embodiment, step a) selects the next group of polystyrene fluorescent pellets as a reference substance:

polystyrene fluorescent pellets having a diameter of 20 nm and an emission wavelength of 488 nm;
polystyrene fluorescent pellets having a diameter of 100 nm and an emission wavelength of 460 nm;
polystyrene fluorescent pellets having a diameter of 200 nm and an emission wavelength of 615 nm;
polystyrene fluorescent pellets having a diameter of 300 nm and an emission wavelength of 695 nm.

In another embodiment, step a) selects the next group of polystyrene fluorescent pellets as a reference substance:

polystyrene fluorescent pellets having a diameter of 77 nm and an emission wavelength of 695 nm;
polystyrene fluorescent pellets having a diameter of 100 nm and an emission wavelength of 460 nm;
polystyrene fluorescent pellets having a diameter of 200 nm and an emission wavelength of 615 nm;
polystyrene fluorescent pellets having a diameter of 500 nm and an emission wavelength of 488 nm.

In another embodiment, step a) selects the next group of polystyrene fluorescent pellets as a reference substance:

polystyrene fluorescent pellets having a diameter of 100 nm and an emission wavelength of 460 nm;
polystyrene fluorescent pellets having a diameter of 200 nm and an emission wavelength of 615 nm.
polystyrene fluorescent pellets having a diameter of 300 nm and an emission wavelength of 695 nm;
polystyrene fluorescent pellets having a diameter of 500 nm and an emission wavelength of 488 nm.

In a preferred embodiment, wherein $C_0$ in step c) is 0.1-2.0 μg/mL.

In a more preferred embodiment, wherein $C_0$ in step c) is 0.5-1.0 μg/mL.

In an embodiment, in step d), the filter adopts a needle-type filter, and the amount of the mixed suspension used for filtration operation is 2-4 mL.

In an embodiment, the fluorescence detection described in step d) refers to sequentially performing fluorescence detection on the obtained filtrate under the emission wavelength corresponding to each constituent fluorescent pellet in the mixed suspension.

In an embodiment, step e) first uses Origin software to make a nonlinear fitting curve between the diameter and the retention rate R of the group of fluorescent pellets as a reference substance, and then obtains the values of the pore diameter $d_{50}$ and $d_{90}$ according to the fitting curve, and then calculates the Dore size distribution f(d) according to the following Dore size distribution formula:

$$f(d)=\frac{1}{d\ln(d_{90}/d_{50})\sqrt{2\pi}}\exp\left[-\frac{1}{2}\left(\frac{\ln(d/d_{50})}{\ln(d_{90}/d_{50})}\right)^2\right]$$

and plots the pore size distribution figure, where d represents the pore size and π is the circumference ratio.

Compared with the prior art, the present invention has the following significant beneficial effects:

By using the method of the present invention, the determination of the pore size and pore size distribution of the filter membranes of various specifications can be realized only by selecting the fluorescent pellets with the proper diameter range as the reference substance. The method has a wide range of applications and is simple to operate, which requires only direct preparation of the mixed suspension and one-time filtration. The measurement period is very short—the entire pore size determination process takes only 1-5 minutes, making a significant progress compared with the conventional technique that takes 5-6 hours.

Additionally, according to the method of the present invention, only one filter membrane sample needs to be lost in the whole measurement process (whereas in the prior art, at least three filter membrane samples are required), and the solution concentration of the required reference substance only needs 0.1-2.0 μg/mL (whereas in the prior art, 25 μg/mL is required), and the amount of the solution required for filtration operation is total as long as 2-4 mL (whereas the prior art requires at least hundreds of milliliters). Therefore, compared with the prior art, the present invention can also significantly reduce the detection loss and the detection cost.

In summary, compared with the prior art, the present invention not only has significant progress, but also produces unexpected technical effects.

DETAILED DESCRIPTION OF THE INVENTION

The present invention will be described in greater detail and more fully below with reference to a few particular examples.

Example 1

The method for determining the pore size and pore size distribution of the filter membrane provided by the present embodiment comprises the following steps:

a) Selecting a group of polystyrene fluorescent pellets having different diameters and different emission wavelengths as summarized in the table below as reference standards:

| No. | Diameter (nm) | Excitation Wavelength (nm) | Emission Wavelength (nm) |
|---|---|---|---|
| 1 | 20 | 465 | 488 |
| 2 | 77 | 532 | 695 |
| 3 | 100 | 410 | 460 |
| 4 | 200 | 335 | 615 |

Figure 1:
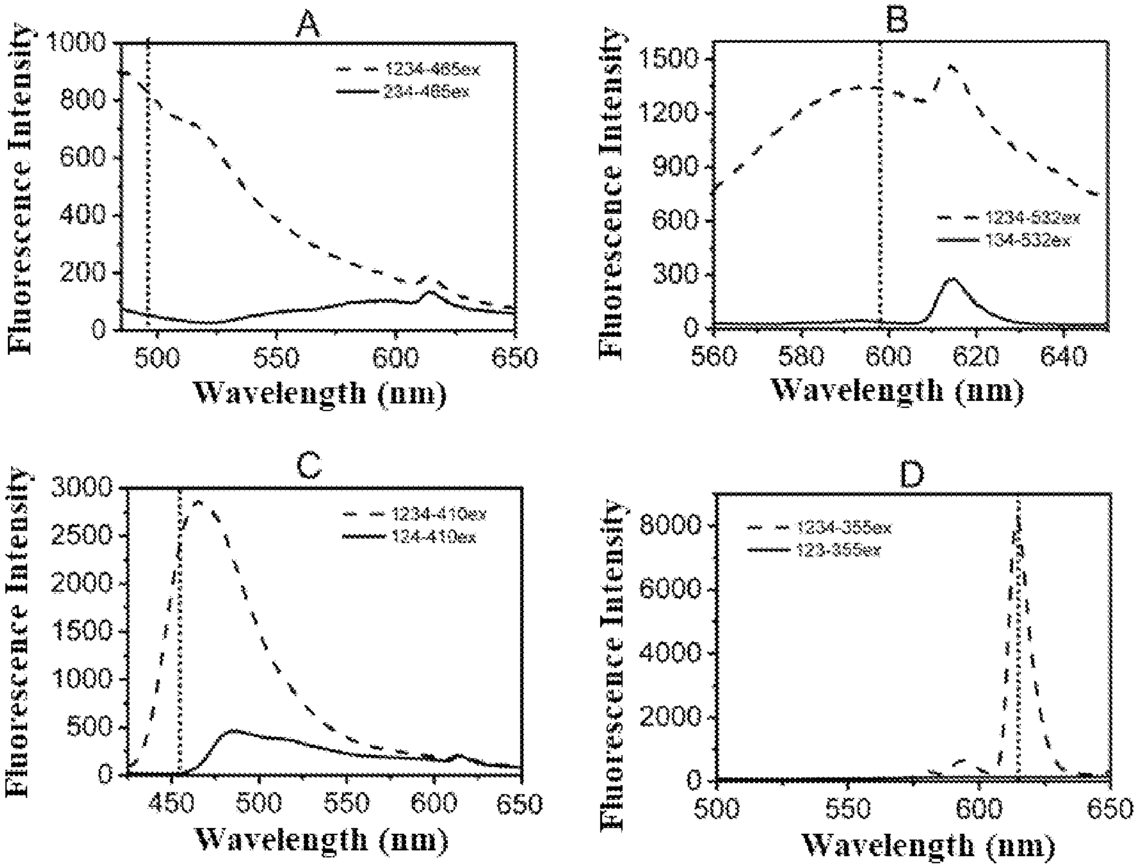
FIG. 1 illustrates fluorescence emission spectra of four types of fluorescent pellet in Example 1, showing that there is no mutual interference of fluorescence signals therefrom.
Figures 2, 3:
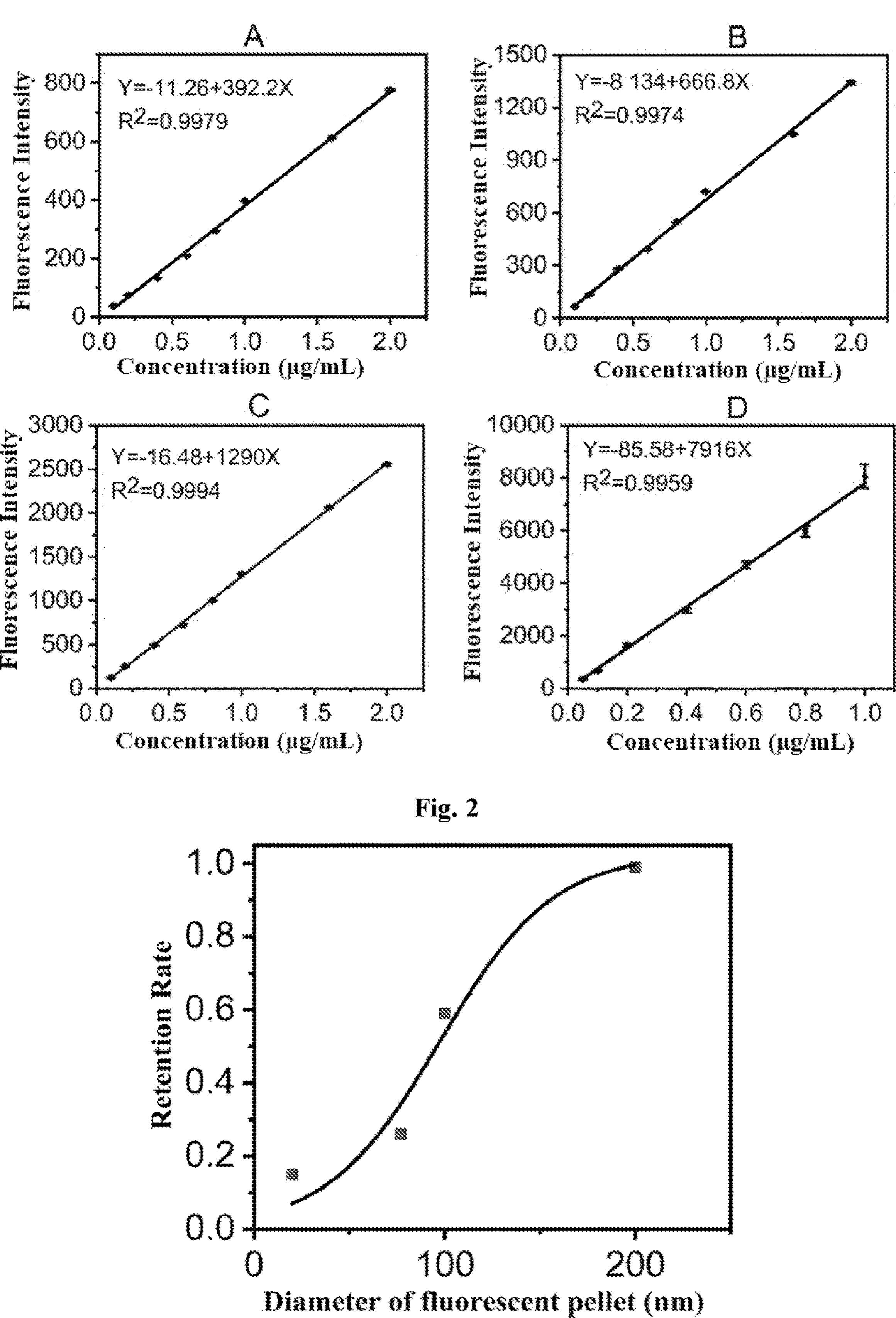
FIG. 2 shows respective standard curves of fluorescence intensity versus concentration for the four types of fluorescent pellet in Example 1 at their respective emission wavelengths, in which Detail A shows the standard curve for the No. 1 type of fluorescent pellet, Detail B shows the standard curve for the No. 2 type of fluorescent pellet, Detail C shows the standard curve for the No. 3 type of fluorescent pellet, and Detail D shows the standard curve for the No. 4 type of fluorescent pellet.
FIG. 3 is a nonlinear curve fitted from the diameters and retention rates R of the four fluorescent pellets in Example 1.
Figure 4:
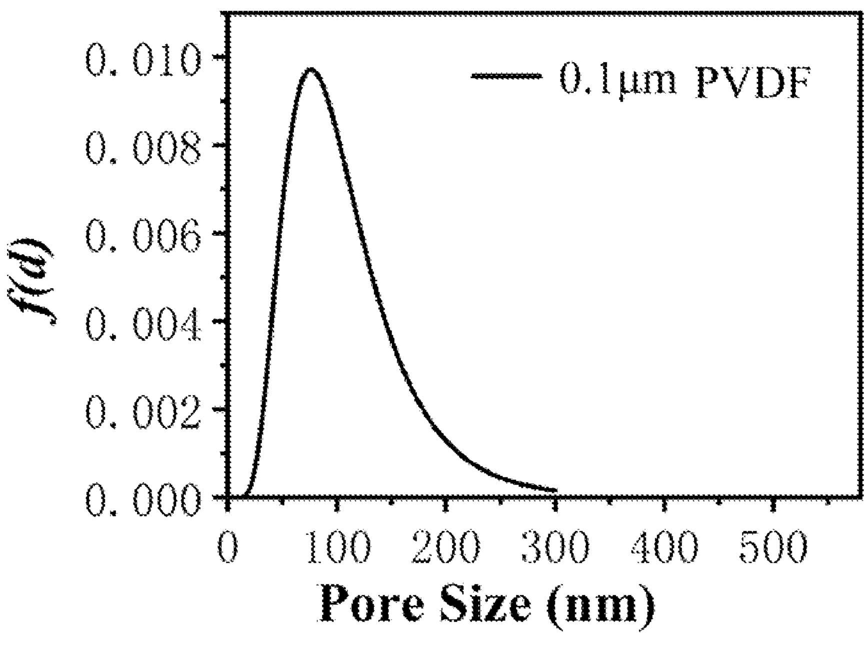
FIG. 4 is a pore size distribution diagram obtained in Example 1.

As can be seen from FIG. 1, fluorescence signals from the selected four types of fluorescent pellet do not interfere with one another, making them suitable to be used as reference standards.

b) Respective standard curves of fluorescence intensity versus concentration for the four types of fluorescent pellet that were selected as reference standards were plotted at their respective emission wavelengths, as shown in detail in FIG. 2, in which Detail A shows the standard curve for the No. 1 type of fluorescent pellet, Detail B shows the standard curve for the No. 2 type of fluorescent pellet, Detail C shows the standard curve for the No. 3 type of fluorescent pellet, and Detail D shows the standard curve for the No. 4 type of fluorescent pellet;

c) The Nos. 1-4 types of fluorescent pellet that were selected as reference standards were dispensed uniformly in water, resulting in a mixed suspension in which the Nos. 1-3 types of fluorescent pellet were each present at a mass concentration $C_0$ of 1 μg/mL and the No. 4 type of fluorescent pellet was present at a mass concentration $C_0$ of 0.5 μg/mL;

d) 2 mL of the mixed suspension was filtered through a diametrically 25-mm circular filtration membrane (a commercially available 0.1 μm PVDF filtration membrane) for use with a syringe filter and 1 mL of the filtrate was subjected to fluorescence detection successively at the emission wavelength for the No. 1 type of fluorescent pellet (488 nm), the emission wavelength for the No. 2 type of fluorescent pellet (695 nm), the emission wavelength for the No. 3 type of fluorescent pellet (460 nm) and the emission wavelength for the No. 4 type of fluorescent pellet (615 nm); concentrations $C_r$ of the four types of fluorescent pellet in the filtrate were then calculated according to the four standard curves in FIG. 2, and retention rates R of the filtration membrane under test for them were calculated according to: $R=(1-C_r/C_0)\times100\%$;

The results are summarized in the following table:

| No. | Diameter (nm) | Retention rate R |
|---|---|---|
| 1 | 20 | 15.02% |
| 2 | 77 | 26.39% |
| 3 | 100 | 60.54% |
| 4 | 200 | 99.63% |

e) A non-linear curve was fitted from the diameters and retention rates R of the four types of fluorescent pellet shown in the above table in the Origin software (as shown in greater detail in FIG. 3) and the pore size ($d_{50}$=96 and $d_{90}$=155) was determined according to the fitted curve; the pore size distribution f(d) was then calculated according to the following formula and plotted (as shown in detail in FIG. 4):

$$f(d) = \frac{1}{d\ln(d_{90}/d_{50})\sqrt{2\pi}}\exp\left[-\frac{1}{2}\left(\frac{\ln(d/d_{50})}{\ln(d_{90}/d_{50})}\right)^2\right]$$

where d represents the pore size and π is the circumference ratio.

Example 2

Figure 5:
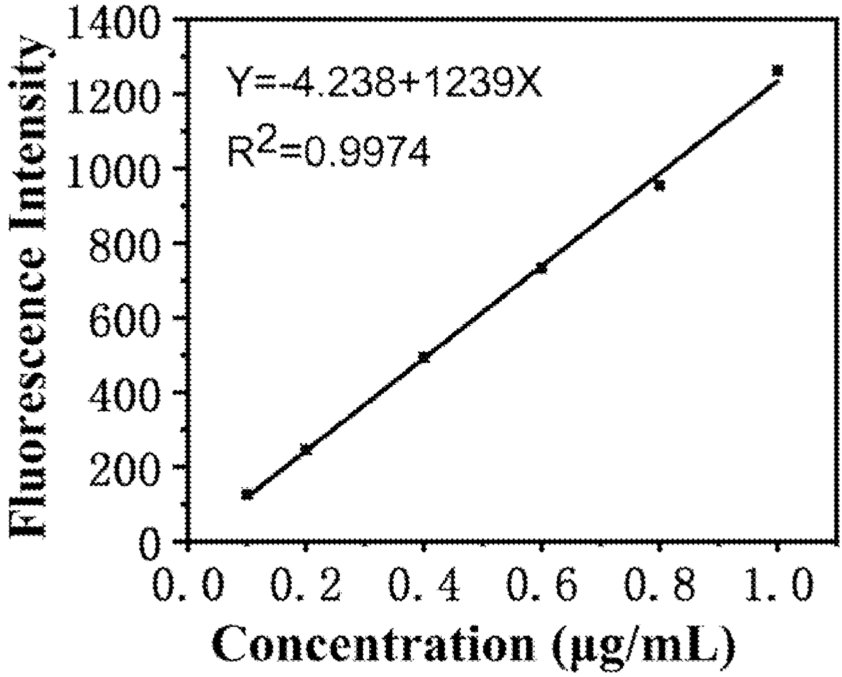
FIG. 5 shows a standard curve of fluorescence intensity versus concentration for the No. 5 type of fluorescent pellet at its emission wavelength in Example 2.

The method for determining the pore size and pore size distribution of the filter membrane provided by the present embodiment comprises the following steps:

a) Selecting a group of polystyrene fluorescent pellets having different diameters and different emission wavelengths as summarized in the table below as reference standards:

| No. | Diameter (nm) | Excitation Wavelength (nm) | Emission Wavelength (nm) |
|---|---|---|---|
| 1 | 20 | 465 | 488 |
| 3 | 100 | 410 | 460 |
| 4 | 200 | 335 | 615 |
| 5 | 300 | 532 | 695 |

b) Respective standard curves of fluorescence intensity versus concentration for the four types of fluorescent pellet that were selected as reference standards were plotted at their respective emission wavelengths, as shown in detail in FIGS. 2 and 5;

c) The Nos. 1, 3, 4 and 5 types of fluorescent pellet that were selected as reference standards were uniformly dispensed in water, resulting in a mixed suspension in which the Nos. 1, 3 and 5 types of fluorescent pellet were each present at a mass concentration $C_0$ of 1 μg/mL and the No. 4 type of fluorescent pellet was present at a mass concentration $C_0$ of 0.5 μg/mL;

d) 2 mL of the mixed suspension was filtered through a diametrically 25-mm circular filtration membrane (a commercially available 0.22 μm PVDF filtration membrane) for use with a syringe filter and 1 mL of the filtrate was subjected to fluorescence detection successively at the emission wavelength for the No. 1 type of fluorescent pellet (488 nm), the emission wavelength for the No. 3 type of fluorescent pellet (460 nm), the emission wavelength for the No. 4 type of fluorescent pellet (615 nm) and the emission wavelength for the No. 5 type of fluorescent pellet (695 nm); concentrations $C_t$ of the four types of fluorescent pellet in the filtrate were then calculated according to the four standard curves in FIGS. 2 and 5, and retention rates R of the filtration membrane under test for them were calculated according to:

$$R=(1-C_t/C_0)\times 100\%$$

Figure 6:
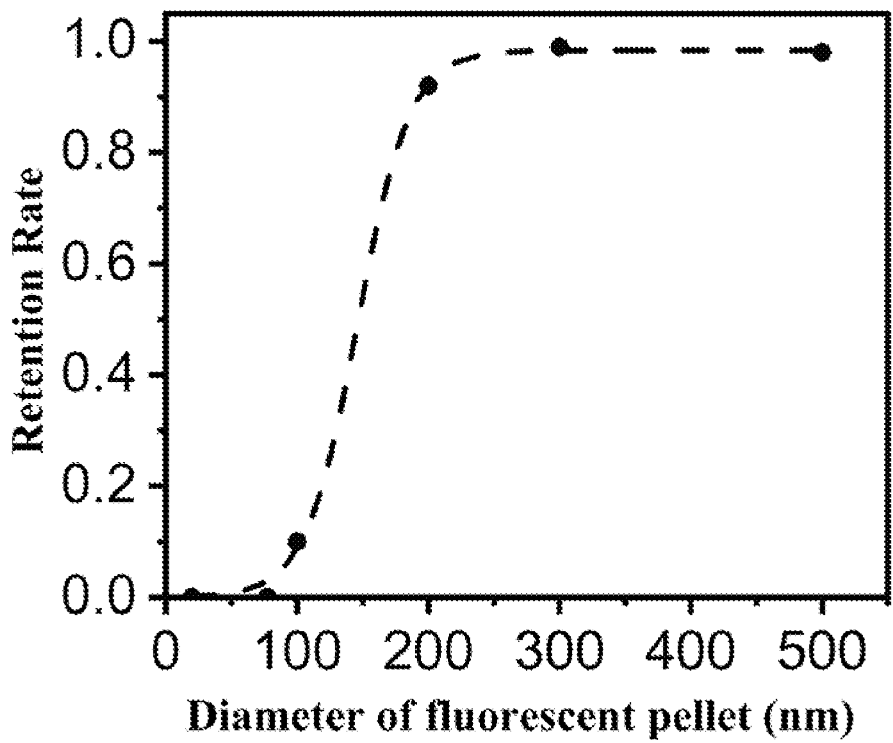
FIG. 6 is a nonlinear curve fitted from the diameters and retention rates R of the four fluorescent pellets in Example 2.
Figure 7:
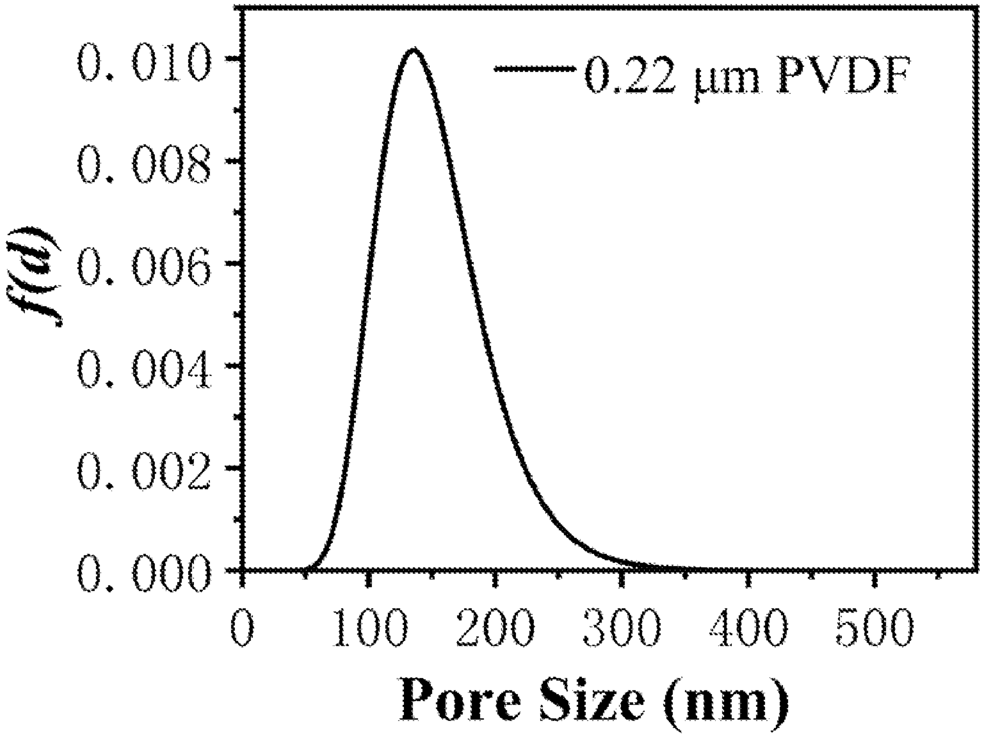
FIG. 7 is a pore size distribution diagram obtained in Example 2.

The results are summarized in the following table:

| No. | Diameter (nm) | Retention rate R |
|---|---|---|
| 1 | 20 | 0.17% |
| 3 | 100 | 8.73% |
| 4 | 200 | 92.35% |
| 5 | 300 | 98.33% |

e) A non-linear curve was fitted from the diameters and retention rates R of the four types of fluorescent pellet shown in the above table in the Origin software (as shown in greater detail in FIG. 6) and the pore size ($d_{50}$=146 and $d_{90}$=193) was determined according to the fitted curve; the pore size distribution f(d) was then calculated according to the following formula and plotted (as shown in detail in FIG. 7):

$$f(d)=\frac{1}{d\ln(d_{90}/d_{50})\sqrt{2\pi}}\exp\left[-\frac{1}{2}\left(\frac{\ln(d/d_{50})}{\ln(d_{90}/d_{50})}\right)^2\right]$$

where d represents the pore size and π is the circumference ratio.

Example 3

Figure 8:
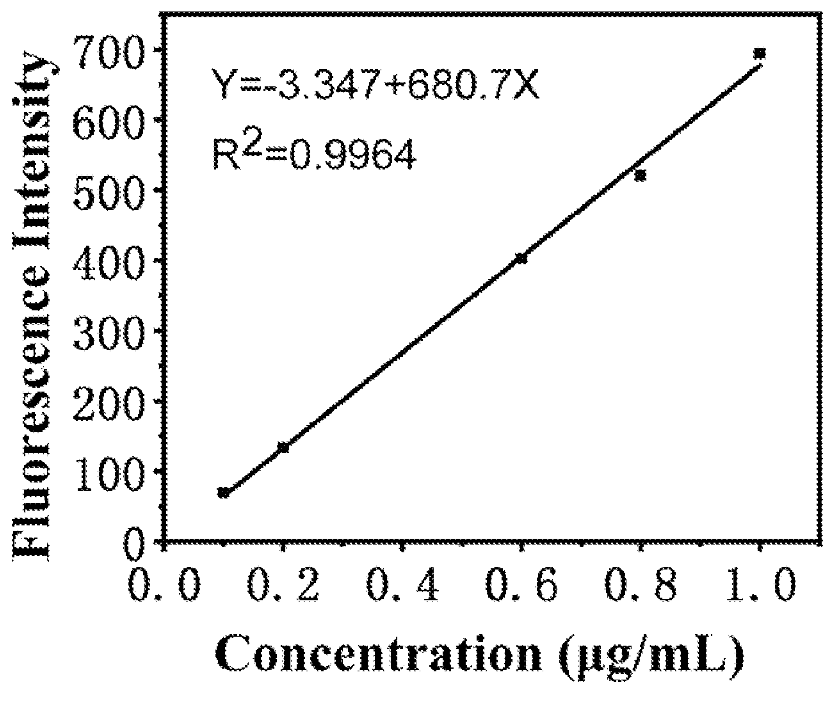
FIG. 8 shows a standard curve of fluorescence intensity versus concentration for the No. 6 type of fluorescent pellet at its emission wavelength in Example 3.

The method for determining the pore size and pore size distribution of the filter membrane provided by the present embodiment comprises the following steps:

a) Selecting a group of polystyrene fluorescent pellets having different diameters and different emission wavelengths as summarized in the table below as reference standards:

| No. | Diameter (nm) | Excitation Wavelength (nm) | Emission Wavelength (nm) |
|---|---|---|---|
| 3 | 100 | 410 | 460 |
| 4 | 200 | 335 | 615 |
| 5 | 300 | 532 | 695 |
| 6 | 500 | 465 | 488 |

b) Respective standard curves of fluorescence intensity versus concentration for the four types of fluorescent pellet that were selected as reference standards were plotted at their respective emission wavelengths, as shown in detail in FIGS. 2 and 8;

c) The Nos. 3-6 types of fluorescent pellet that were selected as reference standards were uniformly dispensed in water, resulting in a mixed suspension in which the Nos. 3, 5 and 6 types of fluorescent pellet were each present at a mass concentration $C_0$ of 1 μg/mL and the No. 4 type of fluorescent pellet was present at a mass concentration $C_0$ of 0.5 μg/mL;

d) 2 mL of the mixed suspension was filtered through a diametrically 25-mm circular filtration membrane (a commercially available 0.45 μm PVDF filtration membrane) for use with a syringe filter and 1 mL of the filtrate was subjected to fluorescence detection successively at the emission wavelength for the No. 3 type of fluorescent pellet (460 nm), the emission wavelength for the No. 4 type of fluorescent pellet (615 nm), the emission wavelength for the No. 5 type of fluorescent pellet (695 nm) and the emission wavelength for the No. 6 type of fluorescent pellet (488 nm); concentrations $C_t$ of the four types of fluorescent pellet in the filtrate were then calculated according to the four standard curves in FIGS. 2 and 8, and retention rates R of the filtration membrane under test for them were calculated according to:

$$R=(1-C_t/C_0)\times 100\%$$

Figure 9:
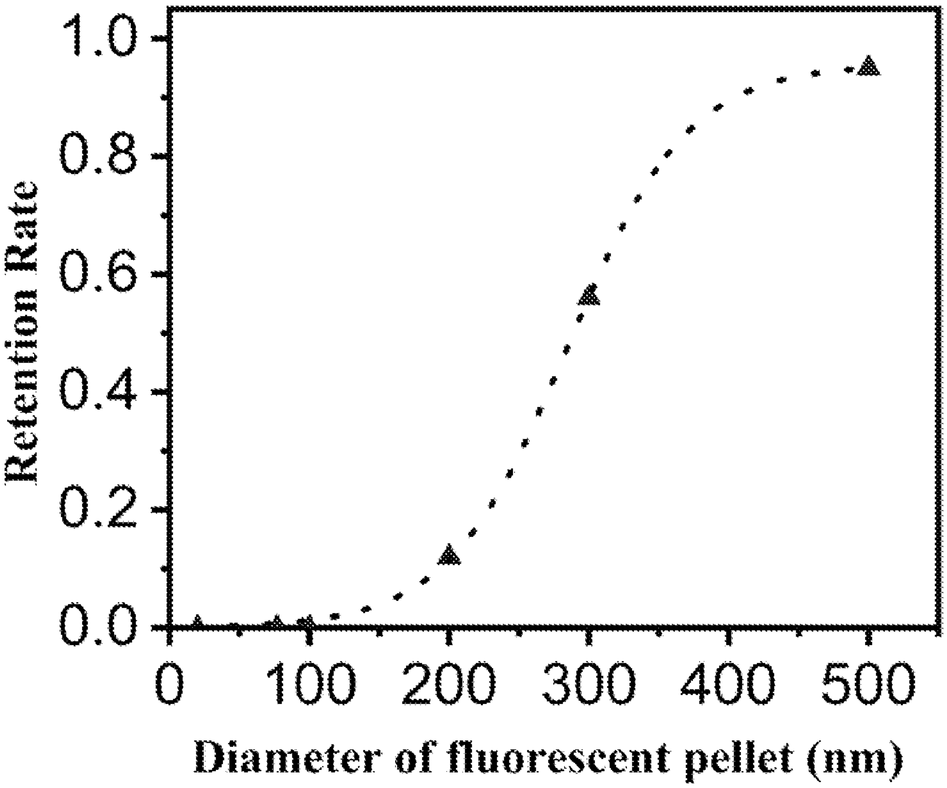
FIG. 9 is a nonlinear curve fitted from the diameters and retention rates R of the four fluorescent pellets in Example 3.
Figure 10:
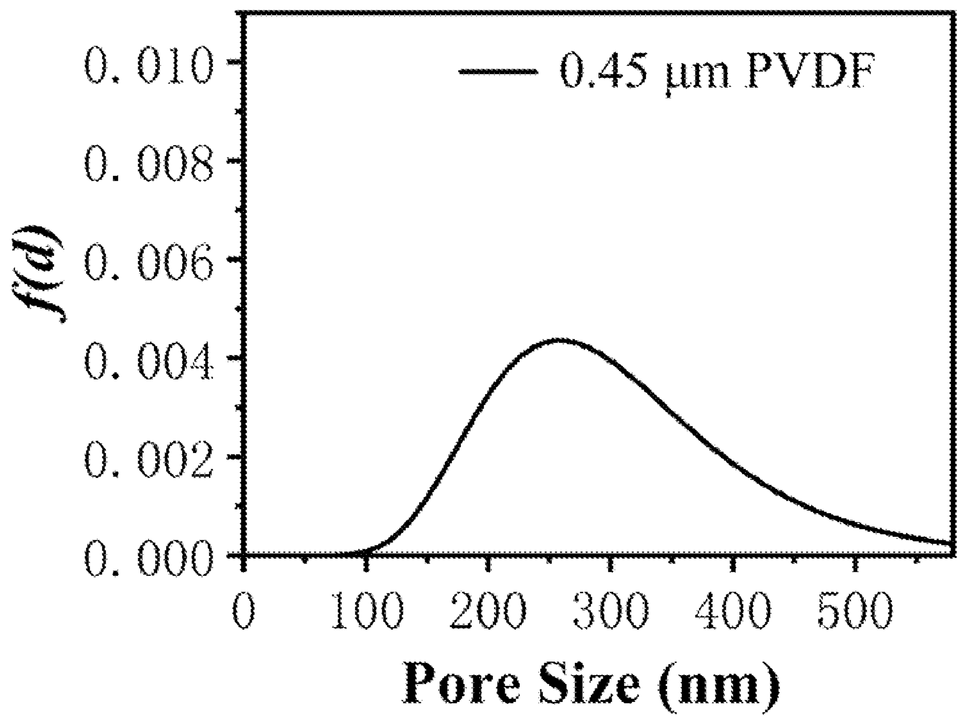
FIG. 10 is a pore size distribution diagram obtained in Example 3.

The results are summarized in the following table:

| No. | Diameter (nm) | Retention rate R |
|---|---|---|
| 3 | 100 | 1.26% |
| 4 | 200 | 11.56% |
| 5 | 300 | 56.10% |
| 6 | 500 | 94.97% |

e) A non-linear curve was fitted from the diameters and retention rates R of the four types of fluorescent pellet shown in the above table in the Origin software (as shown in greater detail in FIG. 9) and the pore size ($d_{50}$=289 and $d_{90}$=404) was determined according to the fitted curve; the pore size distribution f(d) was then calculated according to the following formula and plotted (as shown in detail in FIG. 10):

$$f(d)=\frac{1}{d\ln(d_{90}/d_{50})\sqrt{2\pi}}\exp\left[-\frac{1}{2}\left(\frac{\ln(d/d_{50})}{\ln(d_{90}/d_{50})}\right)^2\right]$$

where d represents the pore size and π is the circumference ratio.

Example 4

This example differs from Example 2 only in that the used filter membrane is a commercially available 0.22 μm PES filter membrane, and the remaining content is as described in Example 2.

Figure 11:
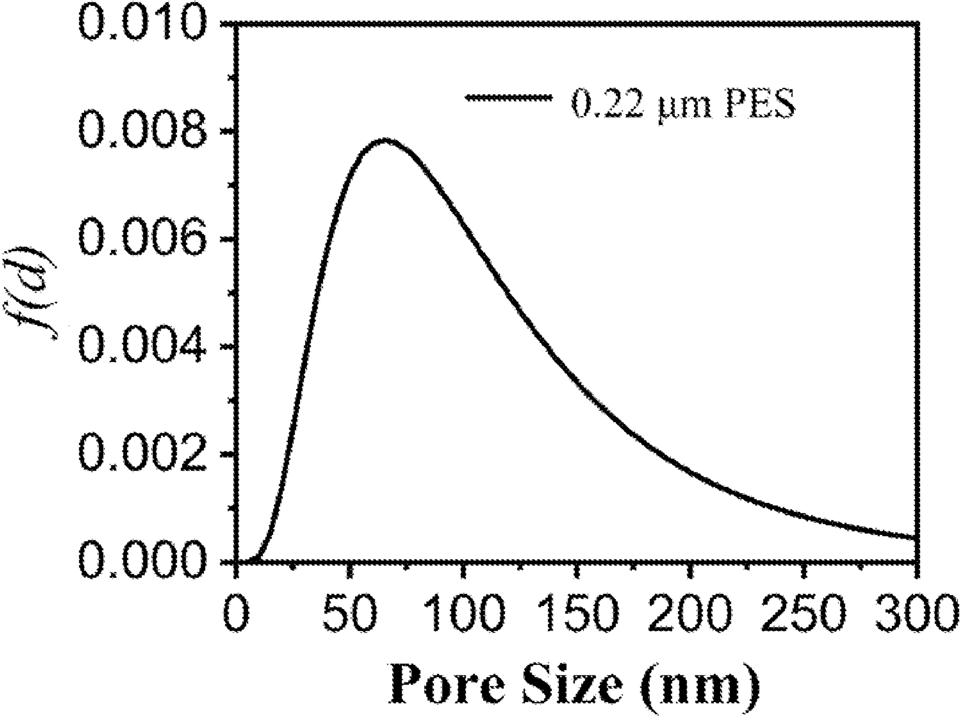
FIG. 11 is a pore size distribution diagram obtained in Example 4.

FIG. 11 shows the pore size distribution diagram of the present embodiment.

Example 5

This example differs from Example 2 only in that the used filter membrane is a commercially available 0.2 μm silicon carbide inorganic ceramic membrane, and the remaining content is as described in Example 2

Figure 12:
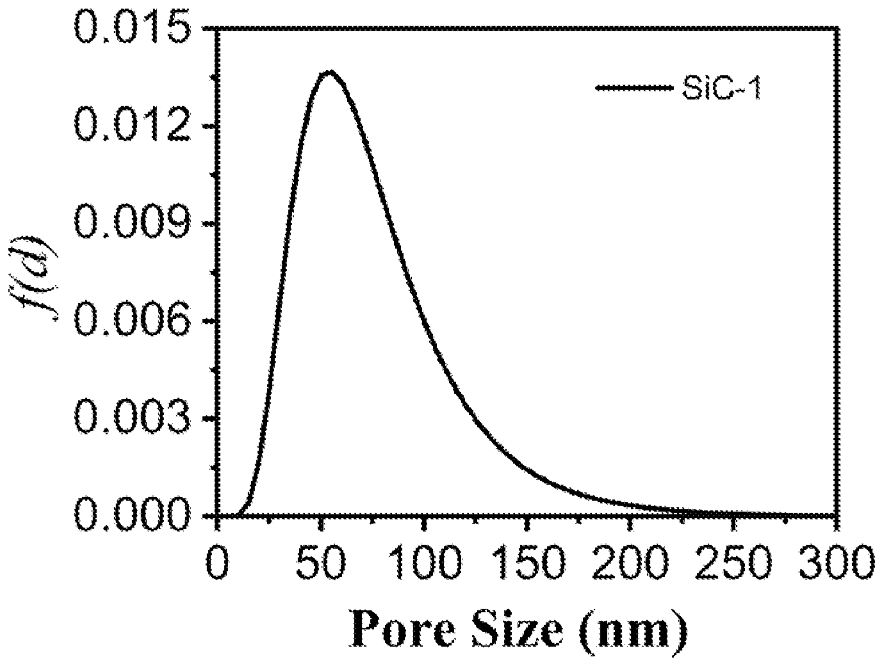
FIG. 12 is a pore size distribution diagram obtained in Example 5.

FIG. 12 shows the pore size distribution diagram of the present embodiment.

Example 6

This example differs from Example 1 only in that the used filter membrane is a commercially available 0.1 μm alumina inorganic ceramic membrane, and the remaining content is as described in Example 1.

Figure 13:
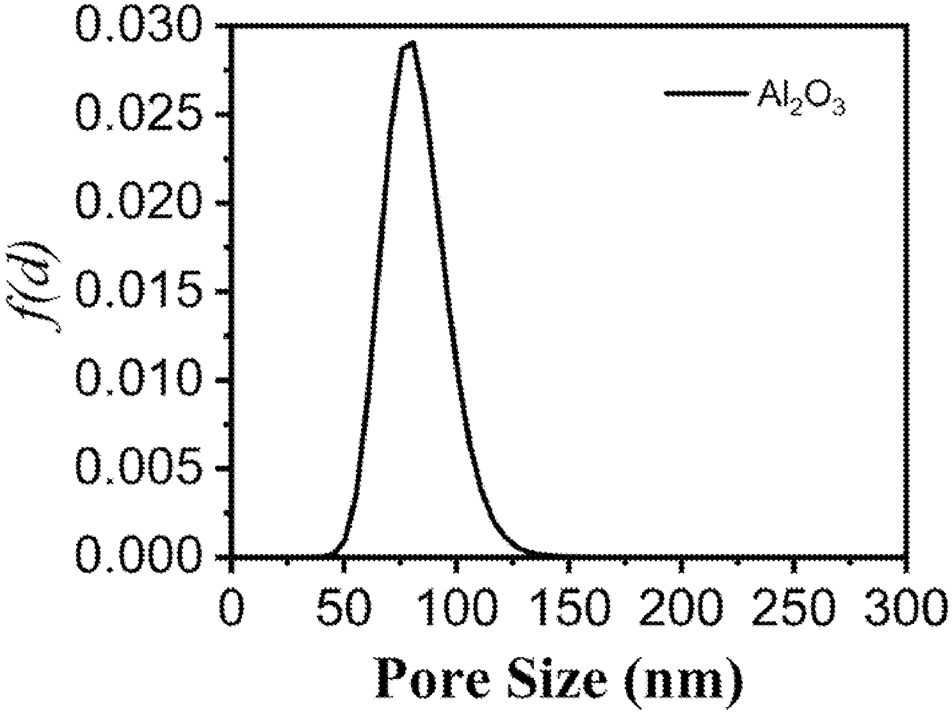
FIG. 13 is a pore size distribution diagram obtained in Example 6.

FIG. 13 shows the pore size distribution diagram of the present embodiment.

Comparative Example 1

The following three types of common polystyrene particles with different particle sizes were selected:

| No. | Particle Size per Manufacturer's Spec (nm) | Dynamic Light Scattering (DLS) Result (nm) |
|---|---|---|
| 1 | 20 | 20.6 |
| 2 | 50 | 53.3 |
| 3 | 100 | 108.7 |

Figure 14:
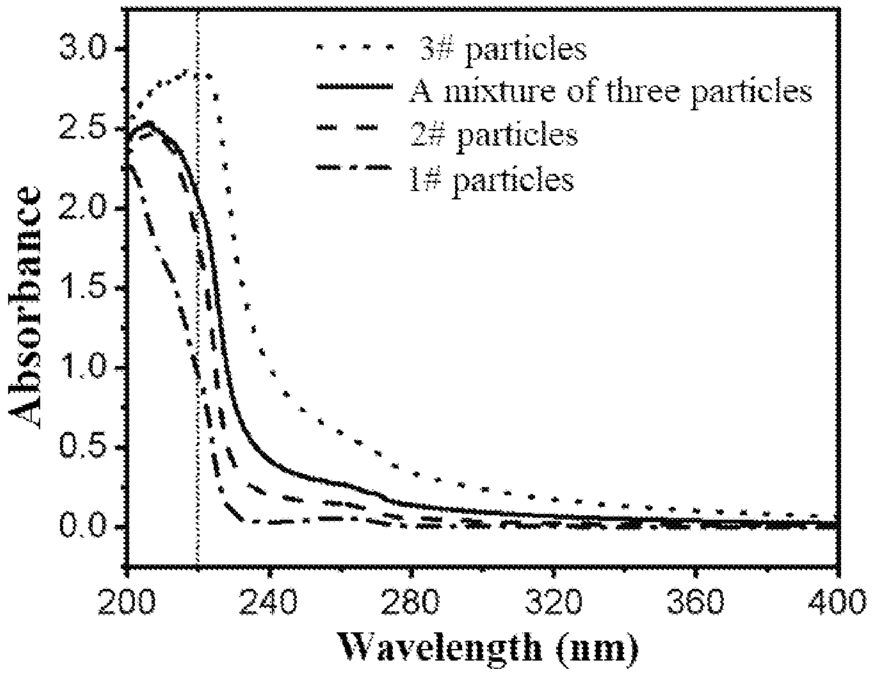
FIG. 14 is a UV detection spectrum obtained in Comparative Example 1.

Individual suspensions of the respective types of particles and a mixed suspension of all the three types of particles in water, each at a mass concentration of 25 μg/mL, were prepared and subjected to UV detection, the UV spectra are shown in detail in FIG. 14.

As can be seen from FIG. 14, although the polystyrene particles that were of different particle sizes but present at the same concentration showed different absorbance values at a detection wavelength of 220 nm, their UV absorption peaks were essentially the same. Therefore, it was impossible to ascertain whether the absorbance differences were attributed to concentration fluctuations or to the different particle sizes, this demonstrates that, in the UV detection-based method disclosed in Chinese Patent Application No. CN201710107174.1, UV detection must be repeated at different particle sizes, once at each particle size.

Comparative Example 2

Figure 15:
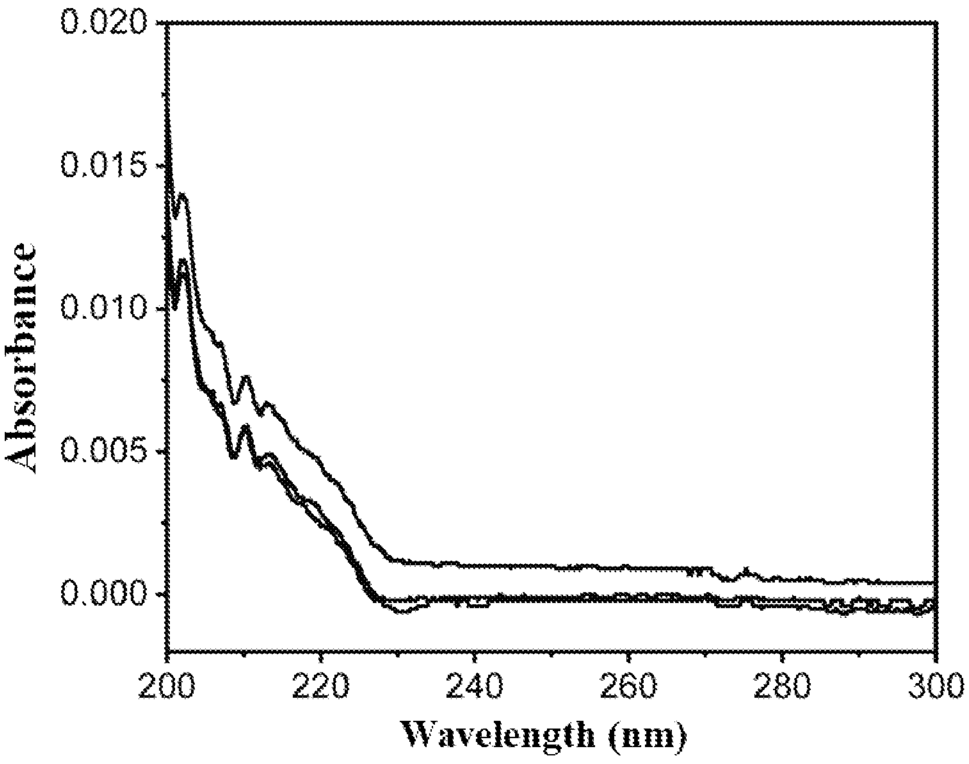
FIG. 15 is a UV detection spectrum obtained in Comparative Example 2.
Figure 16:
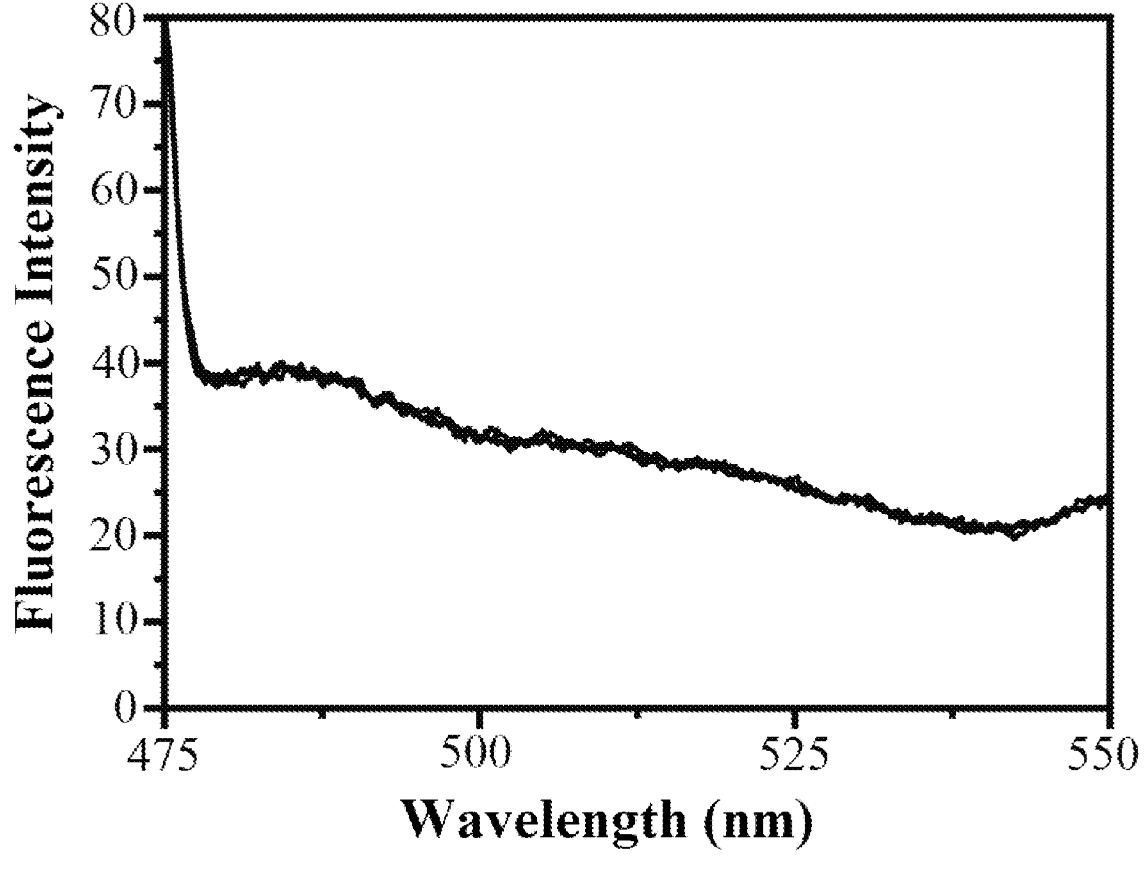
FIG. 16 is a fluorescence detection spectrum obtained in Comparative Example 2.

20 nm common polystyrene particles and 20 nm polystyrene fluorescent pellets are respectively selected, and water is respectively used to prepare a suspension with a mass concentration of 0.1 μg/mL, and then the suspension formed by the 20 nm common polystyrene particles is repeatedly subjected to three times of ultraviolet scanning detection, and the suspension formed by the 20 nm polystyrene fluorescent pellets is repeatedly subjected to three times of fluorescence scanning detection, the specific detection results are shown in FIG. 15 and FIG. 16, respectively.

As can be seen from FIG. 15 and FIG. 16, the suspension having a mass concentration of 0.1 μg/mL formed by the 20 nm common polystyrene particles exhibited very weak ultraviolet absorption close to the detection limit of the detector and produced instable signals. By contrast, the suspension having a mass concentration of 0.1 μg/mL formed by the 20 nm polystyrene fluorescent pellets still produced strong and stable fluorescence signals. It can be proved that the fluorescence detection-based method of the present invention allows the use of a mass concentration of 0.1 μg/mL, while the prior art (Chinese Patent Application No. CN201710107174.1) does not. Therefore, this indicates that the present invention can significantly reduce the loss of the reference standards, which not only produces unexpected technical effects, but also produces significant progress.

Finally, it is to be pointed out that presented above are merely some preferred embodiments of the present invention, which should not be construed as limiting the scope of the invention in any sense. Any and all non-substantive modifications and variations made by those skilled in the art in light of the teachings above are intended to also fall within the scope of the present invention.

What is claimed is:

1. A method for determining pore size and pore size distribution of a filter membrane, characterized in that, the method comprises the following steps:

a) selecting a group of fluorescent pellets having different diameters and different emission wavelengths as a reference substance;

b) plotting a standard curve between mass concentration and fluorescence intensity for each of the fluorescent pellets as the reference substance at its emission wavelength;

c) uniformly dispensing the group of fluorescent pellets as the reference substance in water to prepare a mixed suspension of which mass concentration of each of the fluorescent pellets is $C_0$; wherein $C_0$ is 0.1-2.0 μg/mL;

d) using the filter membrane to perform a one-time filtration by employing a needle-type filter on the mixed suspension prepared in step c), the amount of the mixed suspension used for filtration operation is 2-4 mL; then performing fluorescence detection on obtained filtrate sequentially at the emission wavelength corresponding to each constituent fluorescent pellet in the mixed suspension, and calculating mass concentration $C_t$ of each of the fluorescent pellets in the filtrate according to the standard curve obtained in step b), and calculating retention rate R of the filtration membrane for each of the fluorescent pellets according to the following formula:

$$R=(1-C_t/C_0)\times 100\%;$$ and e) generating a nonlinear fitting curve between the diameter of the group of fluorescent pellets as a reference substance and their retention rate R, then obtaining the values of the pore diameter $d_{50}$ and $d_{90}$ according to the fitting curve, and finally calculating the pore size distribution f(d) according to the following pore size distribution formula:

$$f(d)=\frac{1}{d\ln(d_{90}/d_{50})\sqrt{2\pi}}\exp\left[-\frac{1}{2}\left(\frac{\ln(d/d_{50})}{\ln(d_{90}/d_{50})}\right)^2\right],$$

and plotting the pore size distribution figure, where d represents the pore size and π is the circumference ratio.

2. The method according to claim 1, wherein the fluorescent pellets are polystyrene fluorescent pellets.

3. The method according to claim 1, wherein step a) selects the following group of polystyrene fluorescent pellets as the reference substance:

polystyrene fluorescent pellets having a diameter of 20 nm and an emission wavelength of 488 nm;

polystyrene fluorescent pellets having a diameter of 77 nm and an emission wavelength of 695 nm;

polystyrene fluorescent pellets having a diameter of 100 nm and an emission wavelength of 460 nm; and polystyrene fluorescent pellets having a diameter of 200 nm and an emission wavelength of 615 nm.

4. The method according to claim 1, wherein step a) selects the following group of polystyrene fluorescent pellets as the reference substance:

polystyrene fluorescent pellets having a diameter of 20 nm and an emission wavelength of 488 nm;

polystyrene fluorescent pellets having a diameter of 100 nm and an emission wavelength of 460 nm;

polystyrene fluorescent pellets having a diameter of 200 nm and an emission wavelength of 615 nm; and polystyrene fluorescent pellets having a diameter of 300 nm and an emission wavelength of 695 nm.

5. The method according to claim 1, wherein step a) selects the following group of polystyrene fluorescent pellets as the reference substance:

polystyrene fluorescent pellets having a diameter of 77 nm and an emission wavelength of 695 nm;

polystyrene fluorescent pellets having a diameter of 100 nm and an emission wavelength of 460 nm;

polystyrene fluorescent pellets having a diameter of 200 nm and an emission wavelength of 615 nm; and polystyrene fluorescent pellets having a diameter of 500 nm and an emission wavelength of 488 nm.

6. The method according to claim 1, wherein step a) selects the following group of polystyrene fluorescent pellets as the reference substance:

polystyrene fluorescent pellets having a diameter of 100 nm and an emission wavelength of 460 nm;

polystyrene fluorescent pellets having a diameter of 200 nm and an emission wavelength of 615 nm;

polystyrene fluorescent pellets having a diameter of 300 nm and an emission wavelength of 695 nm; and polystyrene fluorescent pellets having a diameter of 500 nm and an emission wavelength of 488 nm.

* * * * *